March 20, 1956 A. E. COMSTOCK 2,738,868
ARTICLE ADVANCING AND STRIPPING APPARATUS
Filed Dec. 2, 1952 4 Sheets-Sheet 1

INVENTOR.
Alfred E. Comstock,
BY
Cromwell, Greist & Warden
ATTYS.

March 20, 1956 A. E. COMSTOCK 2,738,868
ARTICLE ADVANCING AND STRIPPING APPARATUS
Filed Dec. 2, 1952 4 Sheets-Sheet 2

INVENTOR.
Alfred E. Comstock,
BY
Cromwell, Greist & Warden
Attys.

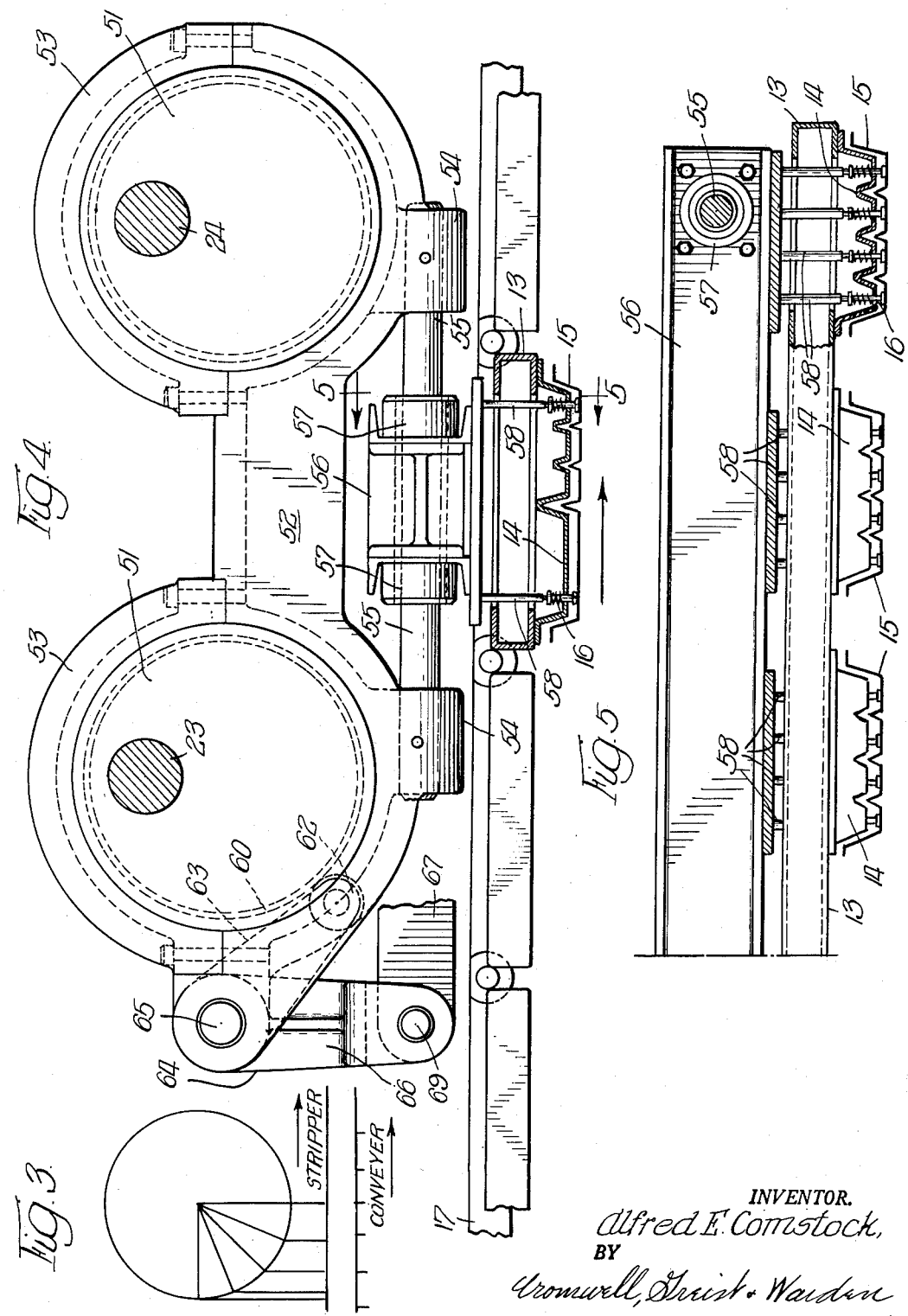

March 20, 1956 A. E. COMSTOCK 2,738,868
ARTICLE ADVANCING AND STRIPPING APPARATUS
Filed Dec. 2, 1952 4 Sheets-Sheet 4
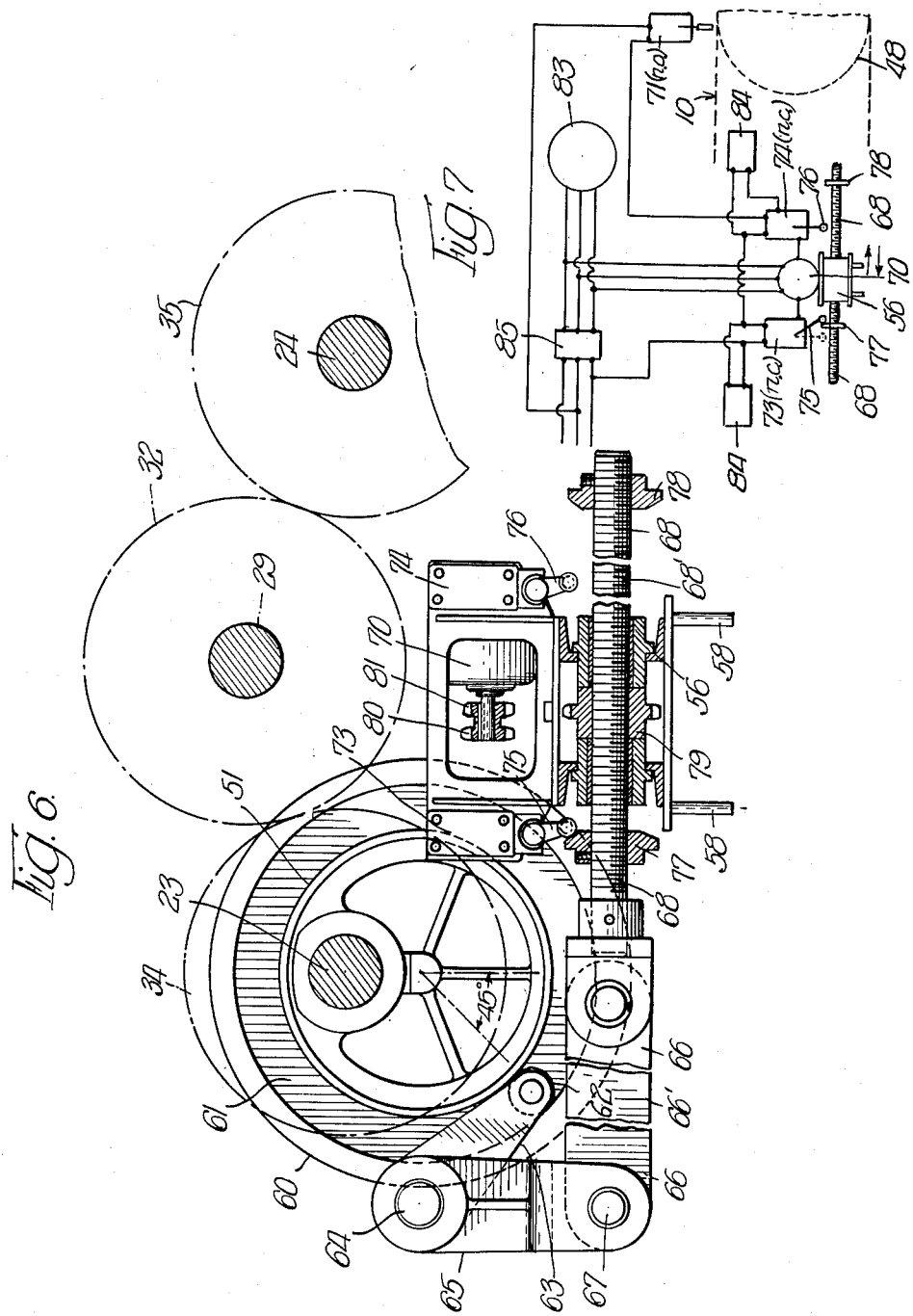
INVENTOR.
Alfred E. Comstock,
BY
Cromwell, Greist & Warden
attys.

United States Patent Office 2,738,868
Patented Mar. 20, 1956

2,738,868

ARTICLE ADVANCING AND STRIPPING APPARATUS

Alfred E. Comstock, Palmer, Mass., assignor, by mesne assignments, to The Diamond Match Company, New York, N. Y., a corporation of Delaware Application December 2, 1952, Serial No. 323,572

19 Claims. (Cl. 198—185)

The present invention pertains primarily to improvements in an apparatus for continuously advancing a series of molded articles or groups of articles, such as molded paper pulp cartons carried by forms on an endless conveyor, and for stripping the articles from forms.

High speed production methods desirably practiced in the paper pulp molding industry require continuous, uninterrupted operation of the production facilities involved. Therefore, the trend in paper pulp molding equipment is to continuous rotary pulp molding machines, synchronized means to remove molded pulp articles deposited on the molding dies of the molding machine and transfer the articles to drying forms, continuously operating conveyor means to transport those forms through a drier, and, just as important, continuously operating means to remove the dried articles from the forms. As in practically any industrial system, the speed of a pulp molding system is no greater than the speed limitation imposed by its slowest essential operating unit. The improved apparatus of the present invention imposes no speed limitation and, moreover, has provisions to insure accurate synchronization of diversely driven instrumentalities, in order to couple perfect coordination with desired speed and continuity of output.

Generally considered, the improved apparatus of this general description features an endless, link-type conveyor driven at constant speed, by which article carrying forms are transported along parallel horizontal reaches, as through an elongated drying oven, and a plunger-type, eccentric-driven article stripping unit which is actuated in an orbital path of movement. This movement has components of longitudinal motion, paralleling the horizontal reaches of the conveyor, and components of vertical motion transversely across one of the conveyor reaches; accordingly, there is introduced a problem of correlating the uniform longitudinal movement rate of the drying forms with the inherently non-uniform, sinusoidal rate of longitudinal movement normally derived from driving said unit in an orbital path by a rotary agency. Unless the forms and the stripper are exactly synchronized as the orbitally traveling stripping plungers approach molded articles on the forms, failure of correct operation results.

Moreover, since the conveyor mentioned above is intended primarily for use in association with a rotating molding drum from which the conveyor carried drying forms remove molded articles for transportation through a drying oven, and since it is desirable to lift a part of the conveyor from time to time, in order to separate its forms from the molding dies, as when molding and drying dies or forms are changed, it is necessary to make provision to correct or compensate for an additional component of longitudinal travel of the conveyor carried forms which attends such lifting, as by the means hereinafter described in detail, to the end that the conveyor and stripping unit maintain proper relationship when the conveyor is lifted and is again lowered after the change.

It is therefore an object of the invention to provide an improved article advancing and stripping apparatus including a continuously and uniformly traveling, link-type conveyor which advances article carrying and drying forms, a set of plunger-type article stripping members moving in an orbital path parallel to and transversely of the longitudinal path of movement of the forms to engage and strip articles from the latter, rotary means from which this orbital movement is derived, and improved means of a simple nature to correct the inherently non-uniform rate of the longitudinal component of a movement so derived, a sine function, to a uniform rate equal to that of the conveyor, thus insuring that the article stripping unit is accurately synchronized in its engagement with the articles.

More particularly, it is an object of the invention to provide an improved apparatus as described above, in which the means for driving the stripping unit comprises a pair of coordinately driven eccentrics and a stripper carriage coupled therewith for movement in an orbital path, as described, and in which the means for correcting, compensating for or equalizing the non-uniform motion rate of the stripper carriage attending its rotary eccentric-derived drive is a simple cam and cam follower arrangement, actuated by the same means which actuates the eccentrics and connected by a simple linkage to the carriage.

A still further object is to provide an apparatus of the sort described in the preceding paragraph, in which means are provided, preferably in the form of an additional unit coacting with the cam driven compensating linkage for the stripping carriage, to further move the conveyor correctively and offset slight components of longitudinal movement of the same occasioned by bodily shifting thereof, as in a changeover of molding, transfer and drying forms, thereby insuring that the stripping unit and conveyor forms preserve identical relationships with one another in continued driving thereof, before, during and after the bodily shifting of the conveyor referred to.

The foregoing statements are indicative in a general way of the nature of the invention. Other and more specific objects will be apparent to those skilled in the art upon a full understanding of the construction and operation of the apparatus. A single embodiment of the invention is presented herein for purpose of illustration. It will be appreciated that the invention may be incorporated in other modified forms coming equally within the scope of the appended claims.

In the drawings:

Fig. 3 is a schematic sketch depicting the respective longitudinal motion characteristics of the drying form conveyor and article stripping unit of the apparatus;

Fig. 4 is an enlarged fragmentary view in side elevation, as viewed from line 4—4 of Fig. 2, being partially broken away and in vertical longitudinal section, illustrating the article stripping unit in operative relation to the form conveyor, and also, in a general way, the provisions for synchronizing and equalizing the longitudinal movement of the unit and forms on the conveyor;

Fig. 5 is a fragmentary view in transverse vertical section along a line corresponding to line 5—5 of Fig. 4, further illustrating the relationship and structural details of the article stripping unit and the longitudinally moving conveyor with which the unit coacts;

Figure 2:
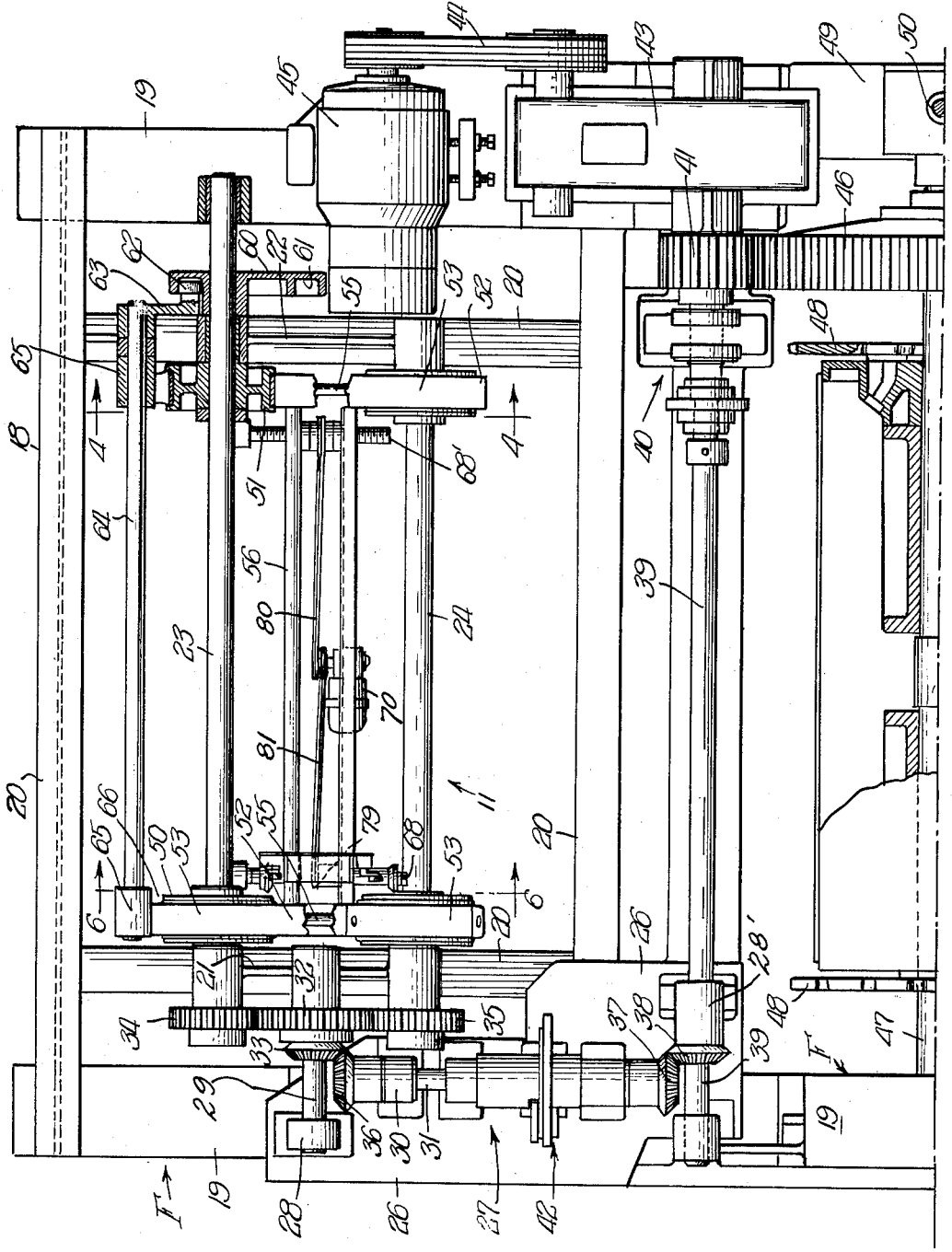
Fig. 2 is a top plan view of the apparatus, also partially broken away and in section to illustrate the cam controlled equalizing or compensating means for the eccentric-driven stripper carriage.

Fig. 6 is a view in vertical longitudinal section on a line corresponding generally to line 6—6 of Fig. 2, further showing details of the eccentric stripper carriage drive, the cam actuated compensating linkage and a motor driven corrective unit for carriage shift, certain bearing provisions and other non-essential structure having been removed for the sake of clarity; and Fig. 7 is a schematic wiring diagram for a compensating motor circuit involved in the operation of the apparatus.

As mentioned above, the present apparatus has for its general object the stripping of molded pulp articles, such as egg cartons, in sets from article mounting drying forms on a continuously and uniformly moving longitudinal conveyor, by which conveyor the articles have previously been transported through an elongated drying chamber or oven. The drying forms have the wet molded articles transferred thereto from a rotary molding drum, the forms being engaged with dies on the drum as they are advanced by the conveyor.

An apparatus of the general type in question is illustrated in my copending application, Serial No. 299,213, filed July 16, 1952. Reference may be made thereto for further description of certain molding and transfer units usually associated with the present apparatus, yet not of primary importance or significance in the present invention.

Figure 1:
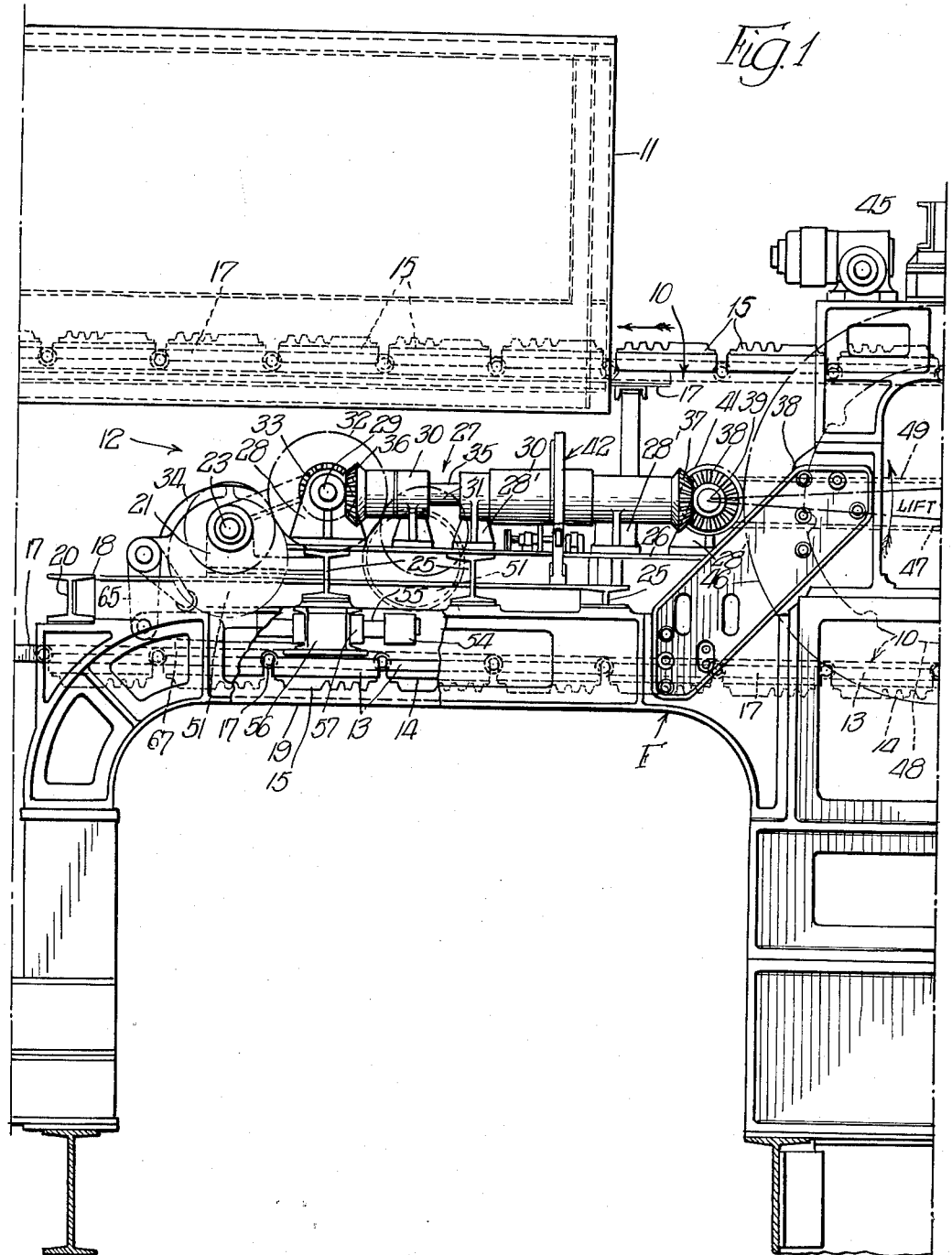
Fig. 1 is a fragmentary view in side elevation illustrating the improved apparatus as operatively associated with a standard type of article drying oven, the view being partially broken away to more clearly illustrate certain structural details and relationships.

The illustrated apparatus has three main components. These comprise an elongated, endless link or chain-type conveyor 10 upon which article carrying forms are continuously translated, in an upper horizontal reach of the conveyor path, through an elongated drying chamber or oven 11. The oven is entirely conventional in character. Finally, a stripping unit 12 provides a set of stripping plungers which are moved by a stripper carriage in an orbital manner in a vertical plane. This orbital path has a longitudinal component superimposed over and paralleling the path of longitudinal movement of the lower reach of conveyor 10, beneath oven 11. Frame F is massive in character and may be described as being of inverted U-shaped outline, as shown in Fig. 1. This affords space beneath unit 12 for chutes C to receive articles discharged from the conveyor forms. In addition to unit 12, frame F supports various bearing and driving instrumentalities for the conveyor and unit. However, particular details of the frame construction form no part of the invention.

Conveyor 10 and the drying forms which it carries may be constructed as illustrated and described in detail in my copending application Serial No. 134,229, filed December 21, 1949, and now Patent No. 2,703,041. The conveyor-form construction is made up of a longitudinal succession of transversely elongated rectangular frames 13, preferably of hollow aluminum construction, and each of these frames has a transversely aligned row of shaped article drying forms 14 secured thereto, in sealed relation to a set of bottom openings to the interior of the frame. As explained in my last named copending application, suction is applied to the opposite side of the frames for the purpose of transferring a set of articles, such as the molded pulp egg cartons 15, from a rotary molding mechanism or device (not shown) onto a row of drying forms 14.

Each of the forms 14 is provided with a set of spring retracted stripping pins 16 (see Fig. 5), individually urged toward the rear of the frame 13 on which the form is mounted. Pins 16 are adapted to be shifted through bottom openings in the forms when engaged from the rear by stripping unit 12, thus to discharge cartons 15 which have been transported by conveyor 10 to the stripping zone or station. They fall into chutes C and are directed by the latter to a receiving point.

The frames 13 for drying forms 14 are suitably articulated as links of an endless chain conveyor by connecting and roller provisions of the sort illustrated and described in my copending application Serial No. 134,229, referred to above; the thus constituted endless form conveyor 10 is suitably guided in traversing oven 11, as well as at the stripping zone adjacent unit 12, by means of appropriate roller tracks. These are generally designated 17 in Fig. 1 of the drawings and do not require further illustration. They should be supported with adequate rigidity, particularly adjacent stripping unit 12, to sustain the vertical stripping load, and appropriate additional provisions may be made for bracing the conveyor structure, if desired.

A super-structure 18 (see Figs. 1 and 2) is mounted on the upper side of a pair of transversely spaced reinforced cross beams 19 of frame F. This structure is composed of a set of interfitted transverse and longitudinal I-beams 20 which support transversely spaced shaft bearing units 21, 22. These in turn rotatively journal a pair of transversely extending, pinion driven eccentric driving shafts 23, 24 of the orbitally traveling stripping unit 12. Further transversely extending I-beams and associated superstructure members, generally designated 25 in Fig. 1, are mounted on the cross beams 19 of machine frame F to support a horizontal platform 26; this platform mounts bearings which support a longitudinally extending drive shaft assembly 27. A journal block 28 is also borne by platform 26, this member coacting with bearing member 21, as shown best in Fig. 2, in rotatively supporting a transverse stub shaft 29. Shaft 29 is driven by shaft assembly 27, and rotation of eccentric drive shafts 23, 24 is derived, in common, from stub shaft 29.

Shaft assembly 27 is generally made up of a series of bearing blocks 28' rotatively mounting a short auxiliary drive shaft 31. A driving gear 32 is fixed on shaft 29 and is driven through a bevel gear 33 also keyed to that shaft. Gear 32 meshes with identical pinions 34, 35 secured to eccentric driving shafts 23, 24, respectively, and bevel gear 33 meshes with a similar bevel gear 36 on the end of auxiliary drive shaft 31. The latter has a further bevel gear 37 secured to the opposite end thereof, which gear 37 meshes with a still further bevel gear 38 secured on a transverse main drive shaft 39 for unit 12.

Shaft 39 is appropriately mounted at this end by a bearing block 28' on platform 26. At its opposite end it is suitably connected, as by a bearing and coupling unit 40, to a small diameter, reduction driven bull pinion 41. Thus upon actuation of pinion 41 power is transmitted through unit drive shaft 39, bevel gears 38, 37, auxiliary shaft 31, bevel gears 36, 33, stub shaft 29 and spur gear 32, which drives the eccentric shaft driving gears 34, 35 on shafts 23, 24, respectively.

Auxiliary shaft assembly 27 may include a manually actuable clutch 42, if desired, for throw-off of power to unit 12 under certain circumstances.

As illustrated in Fig. 2, the bull pinion 41 is direct driven from a conventional speed reduction unit 43 appropriately mounted on the frame F, and this unit takes its driven through a multiple V-belt 44 from a motor 45, also carried by the frame of the apparatus. Pinion 41 meshes directly with a large gear 46 on a transverse shaft 47 journaled by the frame F. Shaft 47 is the shaft upon which drive sprockets 48 for conveyor 10 are fixed, as indicated generally in Figs. 1 and 2; further illustration of this conveyor-sprocket relationship is deemed unnecessary and has been omitted from the drawings in the interest of simplicity and clarity. The teeth of sprockets 48 are suitably engaged with the conveyor frames 13, which are also trained about other idler sprockets at the opposite end of oven 11.

Accordingly, when motor 45 is energized, conveyor sprocket shaft 47 is driven at a substantially reduced speed to advance conveyor 10 uniformly and the eccentric drive shafts 23, 24 of stripping unit 12 are actuated at a speed bearing a predetermined relation to the conveyor speed. Before proceeding to a further description of unit 12 brief mention should be made of the desirability of provisions for bodily shifting sprockets 48, as schematically indicated in Fig. 1, for a distance of, say, five inches lift, in order to disengage drying forms 14 from operative transfer relation to the dies of a molding machine (not shown) with which the present installation is associated, as disclosed in my application, Serial No. 299,213. Such provisions may include a rocker frame 49 journaling sprocket shaft 47 and pivoted on the axis of ball pinion in an appropriate manner. Frame 49 is suitably guided in an arcuate gib (not shown) on the main machine frame F. An adjusting screw 50 threadedly engaging the free end of frame 49 (Fig. 2) may be employed to accomplish the lift referred to, schematically indicated in Fig. 1.

The construction of stripping unit 12 and the provisions to compensate its movement are best understood by reference to Figs. 4 and 6 of the drawings in conjunction with Fig. 2. Circular, plate-like eccentrics 51 are eccentrically secured to each of the shafts 23, 24, in identical angular orientation, as shown best in Fig. 4. The eccentrics are positioned on the respective shafts immediately within the I-beams 20 of the superstructure 18. An orbitally traveling housing or frame for the stripping head of unit 12 is constituted by a pair of rigid end saddle frames 52, each having a pair of spaced semicircular eccentric receiving saddles and coacting boltsecured, semicircular caps 53 forming an eccentric strap for a carriage driven by eccentrics 51. Frames 52 are provided with downwardly projecting bosses 54 which are drilled to fixedly receive the opposite ends of a pair of longitudinal guide rods 55, as illustrated in Figs. 2 and 4, the rods being pinned in place. These rods are positioned directly below the respective eccentric frames 52, and they slidably support a stripper carriage 56 carrying a stripper head, the carriage being longitudinally drilled to receive the rods and provided with rod guide bushings 57. The stripper head has depending stripper plungers 58 mounted thereon, in number and position corresponding to the stripper pins 16 of a row of forms 14 of a given conveyor frame 13 (see Fig. 5).

It is evident that if carriage 56 were in fixed relation to eccentric frames 52, partaking therewith of an orbital movement upon rotation of shafts 23, 24 to drive the respective eccentrics 51, the longitudinal component of this movement would be non-uniform, as graphically depicted in Fig. 3. This is of course due to its rotatively driven source and the fact that successive equal angular increments, on either side of a horizontal plane through the axis of rotation, produce longitudinal increments of progressively increasing, then decreasing, size, as functions of the sine of the angle of the rotative increment. Yet the longitudinal speed of conveyor 10 is uniform.

The apparatus provides means to compensate for this inconsistency in the form of a cam 60 which is secured to the eccentric drive shaft 23, outwardly of superstructure 18, as illustrated in Fig. 2. Cam 60 is provided with a shaped side track 61 which receives a follower roller 62 on a crank arm 63 which is secured on a transverse rock shaft 64 pivoted on the superstructure. A further rocker arm 65 is also pinned to rock shaft 64 in depending relation thereto, and a link 66 is pivoted to the rocker arm at 67. This link extends toward stripper carriage and is pivoted by a clevis to the rear end of a threaded carriage actuating and compensating rod 68. Another similar link 66' is similarly pivoted (Fig. 6) to the rear end of a similar threaded rod 68' at the opposite side of the apparatus; link 66' is in turn pivoted to a further rocker arm 65' secured to rock shaft 64 in the manner of arm 65. The rods 68, 68' are threadedly engaged with carriage 56 in a manner and for a purpose which will be hereinafter described.

Thus, rotation of shaft 23 is accompanied by swinging of crank arm 63, oscillation of shaft 64 and swinging of crank arms 65, 65'. Through links 66, 66' the rods 68, 68' and carriage 56 are given a non-uniform compensatory longitudinal movement on eccentric frame slide rods 55 opposing, in each increment, the non-uniform, sinusoidal movement inherently derived from the orbitally traveling, rotatively driven eccentric frame 52. Those skilled in the art will readily be able to lay out the shape of cam track 61 for the purpose mentioned. It is based on a pitch circle of, for example, 8 inch radius, whose center is located in the vertical plane of shaft 23 and 3.571 inches below the shaft axis. In such a design the outer radius of follower roller 62 will be at the pitch circle radius, with the axis of the roller in a plane 45° from the center of the circle. The shape of the track will decrease radially in outline, from such neutral pitch radius to a low of 7.372 inches in the aforesaid vertical plane, and increase in the opposite direction to a high of 8.565 inches at a horizontal plane through the shaft axis.

Relatively slow longitudinal movement of carriage 56 is thus increased and relatively fast longitudinal movement is diminished, in a degree averaging out to the uniform longitudinal speed of the conveyor 10, as stripper plungers 58 approach and retract from stripper pins 16 on drying forms 14, causing the pins to eject articles or cartons 15 into the chute C. Unfailing register is insured.

Reference has been made to the provisions including pivotal sprocket mounting frame 49 and screw 50 for lifting sprockets 48 and conveyor drying forms from the dies of a rotary molding unit when the forms and dies are to be changed for the production of molded articles of a different style. It is necessary that conveyor 10 be kept in operation while this is done, since articles on drying forms 14 will burn in drying oven 11 if left stationary therein. Stripping unit 12 of course remains in conjoint operation with the conveyor as it is lifted for this purpose.

As the pivotal lifting, form-disengaging movement referred to above takes place, as indicated by curved arrow in Fig. 1, an additional increment of forward movement is superimposed upon the lower reach of conveyor 10, over and above its normal continuous travel, due to the bodily lifting of sprockets 48 with the conveyor forms in fixed relation thereto. This additionally imposed conveyor movement reverses when sprockets 48 are again lowered for re-engagement of forms 14 with the molding dies. Accordingly, if stripping plungers 58 are to remain in proper register with stripping pins 16 on the forms, it is necessary that corresponding increasing and decreasing, forward and reverse increments of movement of stripper carriage 56 be coordinately made, to cause the plungers to follow the pins faithfully.

Such compensation is performed by a small reversing motor 70 which is fixedly mounted at the approximate center of carriage 56, as illustrated in Figs. 2 and 6. An elemental control circuit for this motor is schematically shown in Fig. 7 and will be hereinafter referred to in greater detail. It is under the primary control of a suitable microswitch 71 of the normally open type (Fig. 7), appropriately mounted on frame F. Switch 71 is closed, when sprockets 48 are lifted, by a suitable tappet or the like (not shown) on pivotal sprocket frame 49. It opens automatically when the sprocket frame is again fully lowered, with the forms 14 in position to receive articles from the molding dies. Manipulation of frame 49 is directly performed by screw 50; the latter may be actuated manually, if desired, but is preferably driven by a separate reversing motor 83 (Fig. 7) for reasons which will appear.

A pair of normally closed microswitches 73, 74 are suitably mounted at opposite ends of the motor or carriage 56 for travel therewith, respective actuating arms 75, 76 of these switches being suitably mounted and located in position to engage, respectively, a pair of tappet collars 77, 78 which are fixedly clamped to the threaded compensating rod 68. Stripper carriage 56 is adapted to be shifted along rods 68, 68' in one direction or another, by means of a pair of small chain sprockets 79, 79' threadedly engaging the respective rods. These sprockets are mounted for rotation relative to carriage 56 between appropriate fixed guide bushings. The shaft of compensating motor 70 has a pair of small sprockets 80, 81 thereon which drive, through transversely extending chains 82, the respective rod sprockets 79, 79'. A dual sprocket drive as described is desirable in the interest of preventing angular wracking in the longitudinal shifting of stripper carriage 56.

Assuming the parts in the position illustrated in Figs. 6 and 7, upon initial lifting of conveyor sprockets 48 switch 71 is caused to close and remain closed, as by sliding engagement of a tappet cam in frame 49 with the actuator of switch 71. A compensating motor circuit is completed including closed microswitches 71 and 74 controlling motor 70. This causes carriage 56 to be chain and sprocket driven along rods 68, 68' in the direction of conveyor movement, i. e., to the right as viewed in Figs. 1, 4, 6 and 7. The lower conveyor reach receives its additional increment of forward movement described above. Of course, this takes place as the rods are given the primary carriage compensating motion by cam 69. Movement of the carriage is thus secondarily equated with the increment of conveyor movement, to the extent of the thread-actuated shift, being accurately ascertained by appropriate positioning of tappet collars 77, 78. Thread-actuated carriage movement ceases when actuating arm 76 of normally closed switch 74 strikes tappet collar 78 and the motor circuit is opened at that switch. Stripper unit 12 now continues its oscillatory stripping movements, even after all of the articles have been stripped from forms 14 emerging from drying oven 11.

A momentary push button switch 84 is wired into the circuit of each of the switches 73, 74, enabling a reversing circuit for motor 70 to be established past the switch when it is desired to again lower sprockets. Actuation of switch 84 completes a reversing circuit through closed microswitches 71, 73 and the momentary switch wiring, whereupon a reverse compensating movement of the stripper carriage takes place, until the conveyor sprockets are fully lowered. Microswitch actuating arm 75 again strikes tappet collar 77 to open the motor circuit at switch 73; at the same time, primary control switch 71 is re-opened and motor 70 is de-energized, to remain so until the compensating circuit for stripper carriage 56 is again called into play. This is initiated by depressing the momentary switch 84 of tappet-opened carriage microswitch 73 and lifting of frame 49 to close normally open switch 71.

For proper coordination of the lifting of frame 49 by screw 50 and motor 83, and the threading longitudinal shift of carriage 56 by motor 70, hence the maintaining of proper register of stripper plungers 58 with form-carried stripping pins 16, the motors are driven under the control of a common reversing switch 85, as shown in Fig. 7. Hence, initiation and termination of the bodily translated motions of the sprockets 48 and carriage 56 occur simultaneously.

I claim:

1. Article stripping apparatus of the type described, comprising an endless conveyor on which article carrying forms are mounted in longitudinal succession in the direction of conveyor travel, means driving said conveyor longitudinally at uniform speed, means including a stripper head periodically engageable at a stripping zone with articles on said forms, means mounting said head for orbital movement in a plane including the longitudinal path of movement of the conveyor forms at said stripping zone, said last named means including a rotatable device and operating means connecting the same with said head and normally moving longitudinally at a non-uniform rate in response to rotation of said device, means to drive said device in timed relation to the movement of said conveyor, and means connected to said head and driven in timed relation to said last named drive means to compensate said non-uniform movement rate of said operating means, as applied to said head, and thus synchronize longitudinal movements of said head and conveyor.

2. Article stripping apparatus in accordance with claim 1, in which said conveyor is a chain type one provided with an end sprocket about which conveyor chain elements are trained, and further comprising means to bodily shift said sprocket in a plane transverse of its axis, and means operatively connected to said stripper head to impart compensating movements thereto corresponding to increments of conveyor movement occasioned by said bodily shifting of said conveyor.

3. Article stripping apparatus of the type described, comprising an endless conveyor on which article carrying forms are mounted in longitudinal succession in the direction of conveyor travel, means driving said conveyor longitudinally at uniform speed, means including a stripper head periodically engageable at a stripping zone with articles on said forms, means mounting said head for orbital movement in a plane including the longitudinal path of movement of the conveyor forms at said stripping zone, said last named means including a rotatable device and operating means connecting the same with said head and normally moving longitudinally at a non-uniform rate in response to rotation of said device, means to drive said device in timed relation to the movement of said conveyor, and means operatively connected to said operating means and driven by the drive means therefor to compensate said non-uniform movement rate of said operating means, as applied to said head, and thus synchronize longitudinal movements of said head and conveyor.

4. Article stripping apparatus of the type described, comprising an endless conveyor on which article carrying forms are mounted in longitudinal succession in the direction of conveyor travel, means driving said conveyor longitudinally at uniform speed, means including a stripper head periodically engageable at a stripping zone with articles on said forms, means mounting said head for orbital movement in a plane including the longitudinal path of movement of the conveyor forms at said stripping zone, said last named means including a rotatable eccentric device and operating means connecting the same with said head and normally moving longitudinally at a non-uniform, sinusoidal rate in response to rotation of said device, means to drive said device in timed relation to the movement of said conveyor, and means operatively connected to said operating means and driven by the drive means therefor to compensate said non-uniform movement rate and thus synchronize longitudinal movements of said head and conveyor.

5. Article stripping apparatus in accordance with claim 4, in which said rotatable device comprises a pair of rotatable, similarly oriented eccentrics and said operating means comprises a strap-like frame operatively connected by a linkage to said stripper head and moved by said eccentrics in an orbital path including transverse and longitudinal components.

6. Article stripping apparatus in accordance with claim 4, in which said compensating means comprises a rotatable cam driven by the driving means for said rotatable device.

7. Article stripping apparatus in accordance with claim 4, in which said rotatable device comprises a pair of rotatable, similarly oriented eccentrics and said operating means comprises a strap-like frame operatively connected by a linkage to said stripper head and moved by said eccentrics in an orbital path including transverse and longitudinal components, said compensating means comprising a rotatable cam driven by the driving means for said rotatable device and means modifying the movement imparted to said stripper head by said linkage.

8. Apparatus for transferring molded articles, comprising an endless conveyor having forms on which said articles are mounted, means driving said conveyor longitudinally at uniform speed, article stripping means periodically engageable with said articles at a stripping zone to disengage the same from said forms, said stripping means comprising a stripper head, means mounting said head for combined longitudinal and transverse movement in a plane including the path of longitudinal movement of the conveyor at said stripping zone, a rotatable driving device for said head driven in timed relation to said conveyor, a head actuating member connected to said device and moved at a non-uniform longitudinal rate by the latter, and a compensating unit driven by said rotatable driving device and connecting said head to said member, said unit opposing and compensating said non-uniform movement of said member to a uniform longitudinal head movement in synchronism with the uniform longitudinal movement of said conveyor.

9. Apparatus for transferring molded articles, comprising an endless conveyor having forms on which said articles are mounted, means driving said conveyor longitudinally at uniform speed, article stripping means periodically engageable with said articles at a stripping zone to disengage the same from said forms, said stripping means comprising a stripper head, means mounting said head for combined longitudinal and transverse movement in a plane including the path of longitudinal movement of the conveyor at said stripping zone, a rotatable driving device for said head driven in timed relation to said conveyor, a head actuating member connected to said device and moved at a non-uniform longitudinal rate by the latter, and a compensating unit connecting said head to said member and compensating said non-uniform movement of the latter to a uniform longitudinal head movement in synchronism with the uniform longitudinal movement of said conveyor, said head being mounted for longitudinal movement on said actuating member, said compensating unit comprising a linkage connected to said head and moving the same relative to said actuating member.

10. Apparatus for transferring molded articles, comprising an endless conveyor having forms on which said articles are mounted, means driving said conveyor longitudinally at uniform speed, article stripping means periodically engageable with said articles at a stripping zone to disengage the same from said forms, said stripping means comprising a stripper head, means mounting said head for combined longitudinal and transverse movement in a plane including the path of longitudinal movement of the conveyor at said stripping zone, a rotatable driving device for said head driven in timed relation to said conveyor, a head actuating member connected to said device and moved at a non-uniform longitudinal rate by the latter, and a compensating unit connecting said head to said member and compensating said non-uniform movement of the latter to a uniform longitudinal head movement in synchronism with the uniform longitudinal movement of said conveyor, said head being mounted for longitudinal movement on said actuating member, said compensating unit comprising a linkage connected to said head and moving the same relative to said actuating member, said rotatable driving device comprising a rotating cam connected to said linkage.

11. In combination, a stripping unit, a carriage mounting said unit for longitudinal travel in a predetermined plane, a driver for said carriage moving at a non-uniform longitudinal rate, a conveyor traveling longitudinally in said plane at a uniform rate, and a compensating connection between said driver and carriage said connection being driven by said driver and transmitting movement at said uniform conveyor rate to said carriage.

12. In combination, a stripping unit, a carriage mounting said unit for longitudinal travel in a predetermined plane, a driver for said carriage moving at a non-uniform longitudinal rate, a conveyor traveling longitudinally in said plane at a uniform rate, a compensating connection between said driver and carriage said connection being driven by said driver and transmitting movement at said uniform conveyor rate to said carriage, and a further compensating device to move said stripping unit longitudinally relative to said carriage.

13. In combination, a stripping unit, a carriage mounting said unit for longitudinal travel in a predetermined plane, a driver for said carriage moving at a non-uniform longitudinal rate, a conveyor traveling longitudinally in said plane at a uniform rate, a compensating connection between said driver and carriage said connection being driven by said driver and transmitting movement at said uniform conveyor rate to said carriage, and a further compensating device to move said stripping unit longitudinally relative to said carriage, said carriage being mounted for movement on said driver.

14. In combination, a stripping unit, a carriage mounting said unit for longitudinal travel in a predetermined plane, a driver for said carriage moving at a non-uniform longitudinal rate, a conveyor traveling longitudinally in said plane at a uniform rate, a compensating connection between said driver and carriage said connection being driven by said driver and transmitting movement at said uniform conveyor rate to said carriage, and a further compensating device to move said stripping unit longitudinally relative to said carriage, said carriage being mounted for movement on said driver and said compensating device being mounted on said compensating connection.

15. Article stripping apparatus of the type described, comprising an endless conveyor on which article carrying forms are mounted in longitudinal succession in the direction of conveyor travel, means driving said conveyor longitudinally at uniform speed, means including a stripper head periodically engageable at a stripping zone with articles on said forms, means mounting said head for orbital movement adjacent said conveyor and in a plane including the longitudinal path of movement of the conveyor forms at said stripping zone, said last named means including a rotatable device and operating means connecting the same with said head and normally moving said head in a longitudinal direction at a non-uniform rate, means to drive said device in timed relation to the movement of said conveyor, and means connected to said head and driven in timed relation to said last named drive means to compensate said non-uniform movement rate of said operating means, as applied to said head, and thus synchronize longitudinal movements of said head and conveyor, said endless conveyor including a chain supporting said forms, an end sprocket about which conveyor chain elements are trained, and means to bodily shift part of said conveyor chain transversely in a plane of its movement and thereby shift said forms relative to said stripper head, and means operably connected to said stripper head to impart compensating movements thereto corresponding to increments of conveyor movement occasioned by said bodily shifting thereof.

16. Article handling apparatus comprising, in combination, a conveyor traveling longitudinally at a uniform linear rate, means to actuate the same, a unit traveling in an orbital path and mounted adjacent said longitudinally traveling conveyor for operating on objects advanced by said conveyor, and a driving device for said unit causing the same to travel at a uniform linear rate correlated to the rate of travel of said conveyor, said driving device including a support on which said unit is movably mounted and a connecting means for moving said unit on said support, means driving said support in said orbital path at a non-uniform linear rate, and means actuated by said support drive means and driving said connecting means in a fashion to compensate the non-uniform movement of said support and move said unit at said uniform conveyor rate.

17. Article handling apparatus in accordance with claim 16 in which said driving device comprises a rotatable eccentric moving said support non-uniformly in said orbital path, and in which said connecting means moves said operating unit on said support with a longitudinally sliding compensating movement.

18. Article handling apparatus comprising, in combination, a conveyor traveling longitudinally at a uniform linear rate, means to actuate the same, a unit traveling in an orbital path and mounted adjacent said conveyor, said unit operating on objects advanced by said conveyor and a driving device for said unit causing the same to travel at a uniform linear rate correlated to the rate of travel of said conveyor, said driving device including a support on which said unit is movably mounted, a connecting means for moving said unit on said support, means for driving said support in said orbital path at a non-uniform linear rate, and means actuated by said support drive means and driving said connecting means in a fashion to compensate the non-uniform movement of said support and move said unit at said uniform conveyor rate, and operating means for said apparatus driving said conveyor actuating means and said unit driving device in timed relation to one another.

19. Article handling apparatus in accordance with claim 18 in which said driving device comprises a rotatable eccentric moving said support non-uniformly in said orbital path, and in which said connecting means moves said operating unit on said support with a longitudinally sliding compensating movement.

References Cited in the file of this patent

UNITED STATES PATENTS 2,501,473  Malvicini _____ Mar. 21, 1950